(12) United States Patent
Ranweiler et al.

(10) Patent No.: US 8,930,355 B2
(45) Date of Patent: *Jan. 6, 2015

(54) SYSTEM AND METHOD FOR REFLECTIVE SEARCHING OF PREVIOUS SEARCH RESULTS

(71) Applicant: International Business Machines Corporation, Armonk, NY (US)

(72) Inventors: Michael J. Ranweiler, Beaverton, OR (US); Pradeep Satyanarayana, Beaverton, OR (US); Dub D. Velarde Babb, Portland, OR (US); Brent W. Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/031,095

(22) Filed: Sep. 19, 2013

(65) Prior Publication Data

US 2014/0195528 A1 Jul. 10, 2014

Related U.S. Application Data

(63) Continuation of application No. 13/734,633, filed on Jan. 4, 2013.

(51) Int. Cl.
*G06F 17/30* (2006.01)

(52) U.S. Cl.
CPC ...... *G06F 17/30424* (2013.01); *G06F 17/3053* (2013.01)
USPC .......................................... 707/723; 707/748

(58) Field of Classification Search
USPC ................................................ 707/723, 748
See application file for complete search history.

(56) References Cited

U.S. PATENT DOCUMENTS

| 8,005,823 B1* | 8/2011 | Marshall et al. .............. 707/721 |
| 2005/0278317 A1* | 12/2005 | Gross et al. ....................... 707/3 |
| 2009/0187554 A1* | 7/2009 | Dugan et al. ...................... 707/5 |
| 2009/0282023 A1 | 11/2009 | Bennett |
| 2010/0228715 A1* | 9/2010 | Lawrence ..................... 707/706 |
| 2011/0022599 A1* | 1/2011 | Chidlovskii et al. .......... 707/741 |
| 2011/0191363 A1 | 8/2011 | Bell et al. |
| 2011/0208727 A1* | 8/2011 | Jones et al. ................... 707/723 |
| 2013/0066861 A1* | 3/2013 | O'Donnell .................... 707/723 |

OTHER PUBLICATIONS

"Annotated Images—Easy as Pie"; flickr; Annotated Images—Easy As Pie—Flickr—Photo Sharing!; Printed: Dec. 3, 2012; <http://www.flickr.com/photos/cogdog/269039506/>.

(Continued)

*Primary Examiner* — Cam-Y Truong
(74) *Attorney, Agent, or Firm* — Damian Josephs; Arnold Bangali (57) ABSTRACT

An approach for searching within previous search results for new search results is provided. In one aspect, a first computer receives first search contexts from a second computer. The first search contexts include parameters including characteristics of elements of second search contexts and parameters including weight of importance to the user that elements of the second search contexts includes the characteristics of the first search contexts. In addition, the first computer searches for the characteristics of the elements of the second search contexts in a repository. In another aspect, the first computer determines a match between the characteristics of the elements of the second search contexts and characteristics elements of the first search contexts, and wherein the first computer ranks a list of the new search results based on the determination.

4 Claims, 6 Drawing Sheets

(56) References Cited

OTHER PUBLICATIONS

"Enable Cookies"; Google; Enable cookies—Web Search Help; Printed: Dec. 3, 2012; <http://support.google.com/websearch/bin/answer.py?hl=en&answer=35851>.

Kohl'S; Kohl's—Shop Clothing, Shoes, Home, Kitchen, Bedding, Toys & More; Printed: Dec. 3, 2012; <http://www.kohls.com/upgrade/webstore/home.jsp>.

U.S. Appl. No. 13/734,633, filed Jan. 4, 2013 entitled "System and Methd for Reflective Searching of Previous Search Results".

\* cited by examiner

SYSTEM AND METHOD FOR REFLECTIVE SEARCHING OF PREVIOUS SEARCH RESULTS

CROSS REFERENCE TO RELATED APPLICATION

This application is a continuation of U.S. patent application Ser. No. 13/734,633 filed Jan. 4, 2013 the entire content and disclosure of which is incorporated herein by reference.

FIELD OF THE INVENTION

The present invention relates generally to searching for web pages, and more particularly to reflective searching within previous search results based on data of one or more current search contexts or search terms.

BACKGROUND

Through the use of a user interface, such as a user interface of a web browser, a user can have access to web pages that contain information. One unique technique for finding specific web pages on the Internet or an intranet is through the use of a search engine. Search engines typically maintain an index of millions or billions of web pages and provide a web browser interface that can be used to search and access web pages by keywords and text phrases in the web pages. Some well know search engines include Google™ (Google is a trademark of Google Inc. in the United States, other countries, or both) and Yahoo!® (Yahoo is a trademark of Yahoo Inc. in the United States, other countries, or both).

SUMMARY

In one embodiment of the present invention, a method is provided for searching within previous search results for new search results. The method comprises, a first computer receiving a plurality of first search contexts from a second computer, the plurality of the first search contexts including parameters identifying characteristics of elements of second search contexts and parameters identifying weight of importance to the user that elements of the second search contexts includes the characteristics of the first search context. The method further comprises, the first computer searching for the characteristics of the elements of the second search contexts in a repository. The method further comprises, the first computer determining a match between the characteristics of the elements of the second search contexts and characteristics elements of the first search contexts. The method further comprises, the first computer determining if the second search context is related to the first search contexts based on the match, and wherein the first computer ranks a first list of search results based on the determination. The method further comprises, the first computer merging the second search contexts and first search contexts if the second search context is related to the first search contexts. The method further comprises, the first computer creating a second list of search results based on the merge. The method further comprises, the first computer transmitting the list to the second computer.

In another embodiment, a computer system is provided for searching within previous search results for new search results. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises, program instructions to receive a plurality of first search contexts from a second computer, the plurality of the first search contexts including parameters identifying characteristics of elements of second search contexts and parameters identifying weight of importance to the user that elements of the second search contexts includes the characteristics of the first search context. The computer system further comprises program instructions to search for the characteristics of the elements of the second search contexts in a repository. The computer system further comprises program instructions to determine a match between the characteristics of the elements of the second search contexts and characteristics elements of the first search contexts. The computer system further comprises program instructions to determine if the second search context is related to the first search contexts based on the match, and wherein the first computer ranks a first list of search results based on the determination. The computer system further comprises program instructions to merge the second search contexts and first search contexts if the second search context is related to the first search contexts. The computer system further comprises program instructions to create a second list of search results based on the merge. The computer system further comprises program instructions to transmit the list to the second computer.

In yet another embodiment, a computer program product is provided for searching within previous search results for new search results. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer to receive a plurality of first search contexts from a second computer, the plurality of the first search contexts including parameters identifying characteristics of elements of second search contexts and parameters identifying weight of importance to the user that elements of the second search contexts includes the characteristics of the first search context. The computer program product further comprises program instructions to search for the characteristics of the elements of the second search contexts in a repository. The computer program product further comprises program instructions to determine a match between the characteristics of the elements of the second search contexts and characteristics elements of the first search contexts. The computer program product further comprises program instructions to determine if the second search context is related to the first search contexts based on the match, and wherein the first computer ranks a first list of search results based on the determination. The computer program product further comprises program instructions to merge the second search contexts and first search contexts if the second search context is related to the first search contexts. The computer program product further comprises program instructions to create a second list of search results based on the merge. The computer program product further comprises program instructions to transmit the list to the second computer.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein like reference numerals indicate like components, and:

DETAILED DESCRIPTION

Embodiments of the present invention provide reflective searching within previous or existing search results of an existing web page search. In one aspect, new searches for new search results of a web page are grouped into an array or group of related searches of the existing search results of the existing web page search, wherein the array or group of related searches highlight the most relevant existing search results of the new searches to provide the new search results based on user preferences of both of the existing search results and the new searches.

In particular, the present invention provides searching and ranking within the existing search results based on a first search context of the new searches. The first search context includes parameters identifying characteristics of elements of a second search contexts of the existing search results, and parameters identifying weight of importance to the user that elements of the second search contexts includes the characteristics of the first search context, as described in further details below, in accordance with embodiments of the present invention. Embodiments of the present invention are further adapted to transmit the existing search results of the second search contexts to one or more users via email, electronic documents and the like. In one aspect, a user can enable or disable transmission of the existing search results, in accordance with embodiments of the present invention.

Embodiments of the present invention will now be described in detail with reference to the accompanying drawings.

Figure 1:
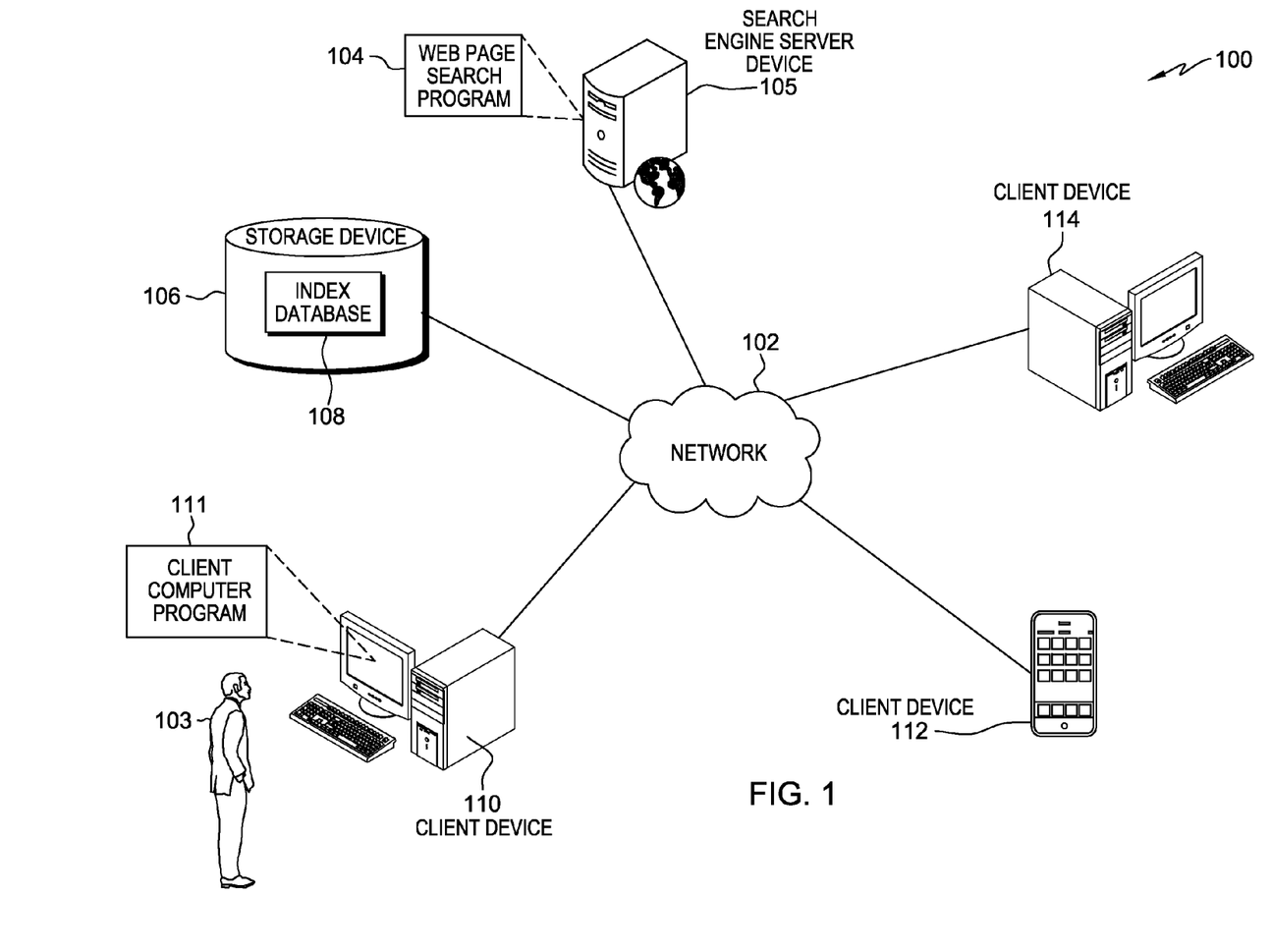
FIG. 1 is a functional block diagram of a reflective search system in accordance with embodiments of the present invention.

FIG. 1 is a functional block diagram illustrating reflective search system 100, in accordance with an embodiment of the present invention. Reflective search system 100 includes search engine server computer 105, storage device 106 containing index database 108, and client computing devices 110, 112, and 114. Search engine server device 105, storage device 106, and client devices 110, 112, and 114 can all be interconnected over network 102.

Search engine server device 105 can be, for example, a management server, a web server, or any other electronic device or computer capable of receiving and sending data. Search engine server device 105 includes web page search program 104. Web page search program 104 is software residing on search engine server device 105 that delivers web page search results to a user interface of client devices 110, 112, and 114, in accordance with embodiments of the present invention. Storage device 106 can be any type of storage device, storage server, storage area network, redundant array of independent discs (RAID), cloud storage service, or any type of data storage. Index database 108 can be a database of indexed web pages.

In the depicted embodiment, each of client devices 110, 112, and 114 can be a laptop, tablet, or netbook personal computer (PC), a desktop computer, a mainframe or mini computer, a personal digital assistant (PDA), or a smart phone such as a Blackberry®. Each of client devices 110, 112, and 114 includes client computer program 111. Client computer program 111 can be a web browser, a standalone web page search application, or part of a service that monitors and interacts with a web browser or web page search application.

Network 102 may include one or more networks of any kind that may provide communications links between various devices and computers connected together within reflective search system 100. Network 102 may include connections, such as wire, wireless communication links, or fiber optic cables. In one example, network 102 is the Internet, a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network 102 may also be implemented as a number of different types of networks, such as for example, an intranet, a local area network (LAN), or a wide area network (WAN). Client devices 110, 112, and 114 can communicate over network 102 with search engine server device 105 to facilitate searching for new search results within previous or existing search results of a reflective web page search, in accordance with embodiments of the present invention. User 103 can be a user that conducts the reflective web page search in reflective search system 100, in accordance with embodiments of the present invention.

Figure 2:
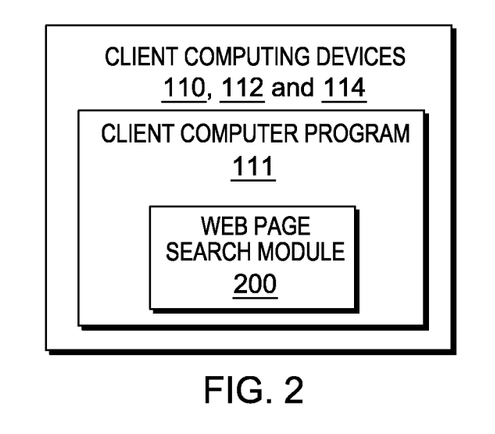
FIG. 2 is a functional block diagram illustrating program components of client devices in accordance with embodiments of the present invention.

FIG. 2 is a functional block diagram illustrating components of client devices 110, 112, and 114. Client computer program 111 can, among other things, retrieve and display content accessible via network 102, such as web pages. In at least one embodiment, client computer program 111 is a web browser. The web browser can be a software application for retrieving, presenting and traversing information resources on the World Wide Web. In one aspect, an information resource is identified by a Uniform Resource Identifier (URI) of the web browser of client computer program 111, and wherein the information resource may be a web page, image, video or other piece of content. Furthermore, hyperlinks, present in the information resource can enable user 103 to easily navigate his or her browser to related information resources pertaining to the reflective web page search within reflective search system 100.

Examples of web browsers include Internet Explorer® (Internet Explorer is a trademark of Microsoft Inc., in the United States, other countries or both), Firefox® (Firefox is a trademark of Mozilla Corporation, in the United States, other countries or both), Safari® (Safari is a trademark of Apple, Inc. in the United States, other countries or both) and Google Chrome™ (Google Chrome is a trademark of Google, Inc. in the United States, other countries or both).

Client computer program 111 includes web page search module 200. In at least one embodiment, web page search module 200 is a web browser plugin/add-on that extends the functionality of client computer program 111 by adding additional user interface elements to a user interface of client computer program 111. The additional user interface allows reflective searching within previous search results for new search results.

In at least one embodiment, the web page received in client computer program 111 can include program code, such as HyperText Markup Language (HTML) code or JavaScript code that, when executed, adds the additional user interface elements to the user interface of client computer program 111, in accordance with embodiments of the present invention. In at least one embodiment, client computer program 111 can send search contexts or search terms to web page search program 104 in response to user pressing a search submit button on client computer program 111, in accordance with embodiments of the present invention.

Furthermore, web page search module 200 populates the user interface of client computer program 111 with a web page search window or web page search elements that allows user 103 to search for one or more web pages on client computer program 111. In one embodiment, user 103 opens a web browser of client computer program 111 or starts a blank web search tab. Thereafter, user 103 can type a search string into a search engine of web page search module 200 within the web browser to conduct the web page search. Hence, the newly typed search string represents a newly created search context or search term.

In one aspect of the present invention, when user 103 conducts a search for information pertaining to a web page on web page search module 200, web page search program 104 measures importance or relevancy of direct and indirect search results based on one or more preferences of user 103, wherein the preferences represent accumulated data of search contexts of the web page search.

The indirect results can be web page search results that were not part of the direct results, but were found by user 103 through navigation of search results in general. For instance, user 103 navigates through information of the search results, and hence the navigated information accumulated data pertaining to the direct search results. The accumulated data includes examination of whether the user bookmarked the indirect search results web page, how much time the user spent on the indirect search results web page or how often the user visited the indirect search results web page. The accumulated data further represents data of the first search context, stored in storage device 106.

For example, user 103 conducts a web page search on "big bird" "sesame street" on web page search module 200. By navigating through web page search results of the web page search, user 103 finds a web page pertaining to "cookie monster", which user 103 bookmarks, tags, and visit often. Furthermore, navigating through the web page search results, user 103 also finds a web page pertaining to "grover". However, user 103 visits the web page pertaining to "grover" only once. Hence, data accumulated pertaining to usage of the web page search result is stored accordingly in storage device 106 for future reference and retrieval. In this manner, when a new web page search pertaining to "big bird" "sesame street" is conducted, the web page on "grover" would be ranked much lower than the page on "cookie monster", in accordance with the present invention.

In this context, by using the stored accumulated data, web page search program 104 determines if a new web page search is related to a previous web page search. For instance, based one the previous web page search, "big bird" and "sesame street", if user 103 at some point in the future conducts a new web page search on "cookie monster" "sesame street" on web page search module 200, and visits the same cookie monster page that user 103 previously encountered during the previous web page search, web page search program 104 determines that the previous web page search context and the new web page search context are related to the point that the previous web page search context, the new web page search context, and search results relating to the previous web page search context and the new web page search context are merged by web page search program 104, and wherein the merged information provides a new search result to user 103 based on the user's preferences of favorite web page search contexts. In one embodiment, web page search module 200 determines data of the new search context, and sends, for example via client computer program 111, the search context to web page search program 104 to perform a reflective search, by comparing the newly submitted search contexts against stored or existing search contexts in storage device 106.

Figure 3:
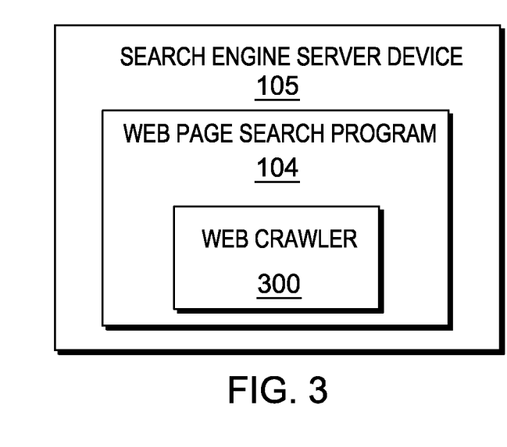
FIG. 3 is a functional block diagram illustrating program components of a search engine server device in accordance with embodiments of the present invention.

FIG. 3 is a functional block diagram illustrating program components of search engine server device 105, in accordance with an embodiment of the present invention.

Search engine server device 105 includes web page search program 104 and web crawler 300. Web crawler 300 collects web pages over network 102 and stores the web pages in index database 108, wherein the web pages are accessible to web page search program 104.

In one embodiment, web page search program 104 receives search contexts, including for example, search strings or search terms of new search contexts from web page search module 200. In at least one embodiment, web page search program 104 performs a query by matching new search contexts against existing search contexts. Furthermore, web page search program 104 varies if the new search context is a match against any existing search context in order to provide related search results based on preferences of user 103, in accordance with embodiments of the present invention.

Specifically, previous searches or search terms by user 103 accumulated an "existing" search context that is stored in storage device 106 for future retrieval and matching against a new search context. Furthermore, web page search program 104 identifies characteristics of elements of the new search contexts and the existing search contexts. The characteristics of elements of the new search contexts and the existing search contexts include the aggregate of search terms, search results and data of the new search contexts and the existing search contexts.

In one aspect of the present invention, the data includes reflective searching activities of user 103 during the web page search of the new search contexts within the existing search contexts, wherein the reflective searching activities includes an accumulation of whether the user 103 bookmarked the existing search contexts, how much time the user spent on the existing search contexts and the new search contexts or how often the user visited the existing search contexts or the new search contents. In one embodiment, characteristic of elements of the new search contexts and the existing search contexts are compared by web page search program 104 against a defined threshold of web page search program 104, to determine whether the new search contexts and the existing search contexts are related. In addition, the existing search contexts and the new search contexts are considered a match if accumulated numerical values of characteristics of elements of the new search contexts and the existing search contexts exceed the defined threshold.

In particular, the new search contexts and the existing search contexts are assigned numerically weighted points, and they are considered a match if total numerically weighted points of the new search contexts and the existing search contexts exceeds the defined threshold of web page search program 104. For example, on a 100 point scale of the defined threshold value, 80 accumulated points of both of the new search contexts and the existing search contexts are considered a match.

Furthermore, if the new search context matches the existing contexts, the new search contexts, the existing search context and related search results of the existing match contexts and the new search contexts are merged by server program 104, and stored in storage device 106, thus providing user 103 with single search contexts of sets of search contexts based on the merged new search contexts, existing search contexts, and related search results of the new search contexts and the existing search context.

In one aspect, the first factor in matching the new search context and the existing search context by web page search program 104 includes a comparison of search terms of the new search contexts and existing search contexts. In particular, a single string match of the search terms of the new search contexts and the existing search contexts are matched, using case insensitive string equality algorithm. For example, the first search term of either of the new search contexts and existing search contexts could be worth three points. The second term would be worth 9 points, and the third term would be worth 27 points, and so on.

In another aspect, the second factor in matching the new search contexts and the existing search contexts by web page search program 104 is search result merging. In particular, if there is an exact match of URLs between the first 10 results of the new search contexts and the existing search contexts, the exact match will be weighted very heavily. For example, on a 100 point scale where 80 points is a match of the new search context and the existing search context, a single URL match of the new search contexts and the existing search contexts could be worth 20 points and the another URL match new search contexts and the existing search contexts would be worth 70 points.

In yet another aspect, the third factor in matching new search contexts and the existing search contexts by web page search program 104 is based on identification of additional data that is used by user 103 in a previous match of the new search contexts and the existing search contexts. For instance, each additional result data entry represents numerical points assigned to the new search contexts and the existing search context. As described, if it is determined that new search contexts matches the exiting search contexts, and thus are related, the new search contexts and the exiting search contexts are merged to provide a merged search result.

In addition, when new search contexts and the exiting search contexts are merged, links to URLs of the new search contexts and the existing search contexts are graphed to an existing result algorithmic tree. Hence, any URLs in the existing tree during the merge would be graphed to the points by which the URLs of the new search contexts and the exiting search contexts match. If the merge occurred without the matched new search contexts and the existing search contexts, then independent trees of results will exist. The context data is displayed with the highest (N) context page score pages in the root of the tree, with the browsing history linked in the trees.

Figure 4A:
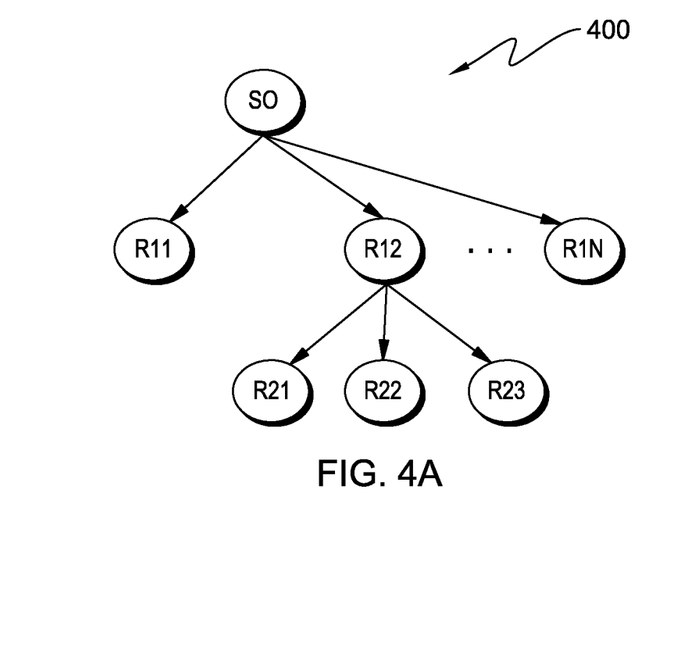
FIGS. 4A-4C illustrate exemplary views of data structures of reflective search results of a web page search program in accordance with embodiments of the present invention.
Figure 4B:
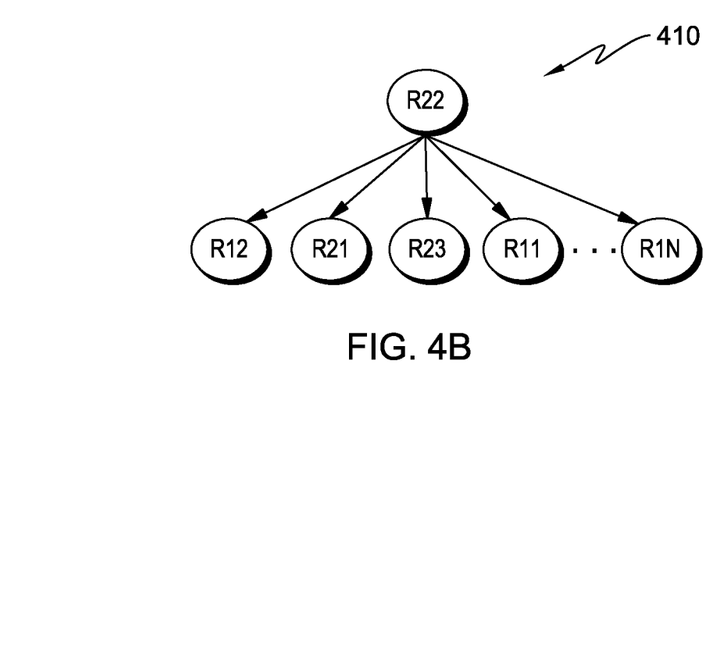
Figure 4C:
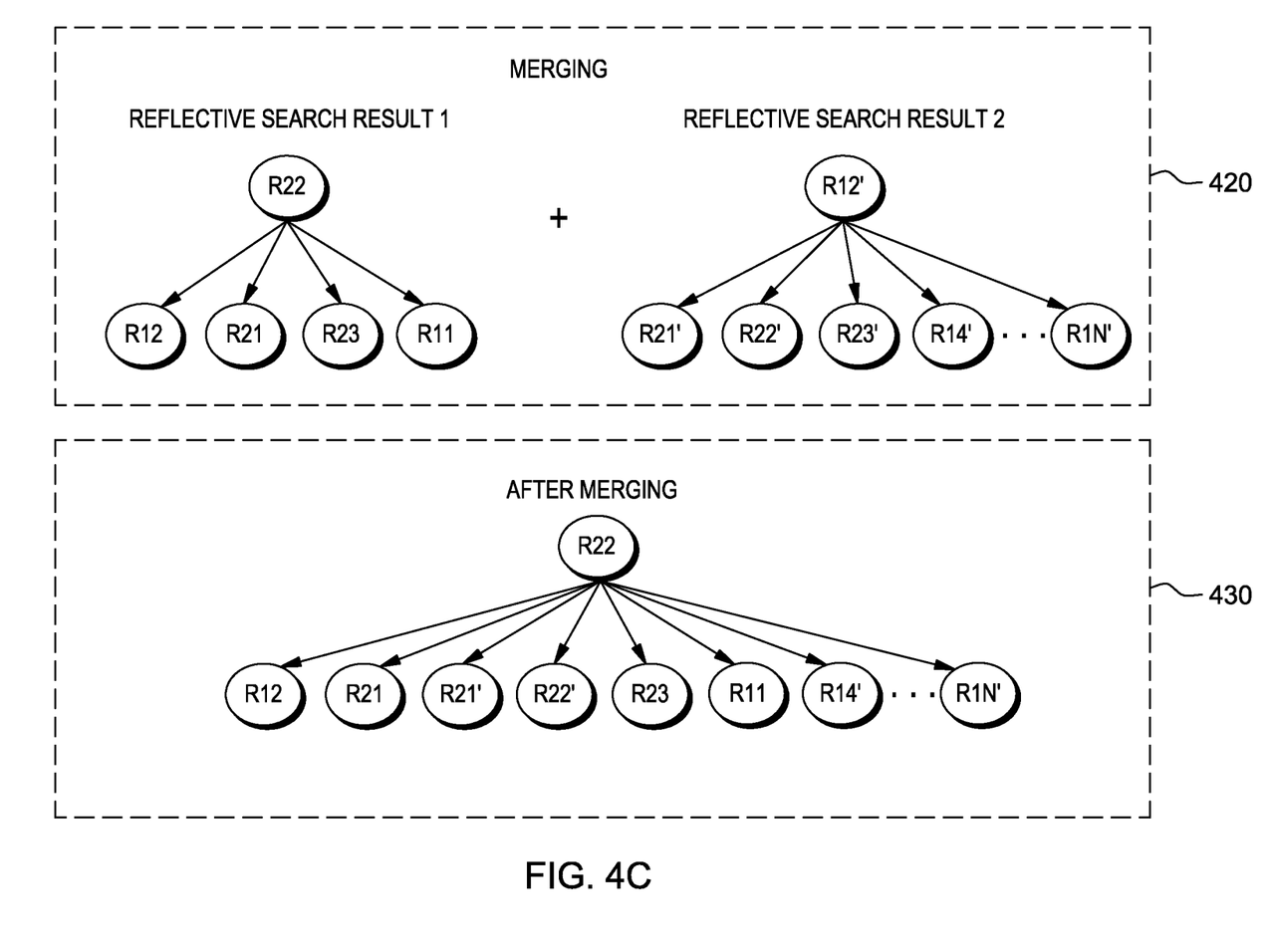

FIGS. 4A-4C illustrates exemplary views of data structures of reflective search results of web page search program 104.

FIG. 4A illustrates a search structure 400 of an existing search context stored in storage device 106 for matching against a new search context of client computer program 111, in accordance with embodiments of the present invention.

In the depicted embodiment, S0 is a first search term of an existing search context, and R11, R11 . . . R1N are the results of S0. In one example, user 103 found a link in result R12, wherein the link is of interest to user 103, wherein user 103 found the link by pursuing the link of interest. Furthermore, by using data of the search result R12, including, for example, time spent on the link or URL, tags, or bookmarks of R12, web page search program 104 determines that link R22 was of particular interest to user 103. Therefore, web page search program 104 stores the data of R22 of R12, by storing R22 to the root of the algorithmic tree for future reference in storage device 106.

FIG. 4B illustrates reflective search results 410 of existing search context S0 of FIG. 4A, in accordance with embodiments of the present invention. As depicted, R22 is the reflective search result of search tree of S0 of an existing search context in storage device 106.

For example, S0 is the existing context, but S0 could also be a search tree of search result R22 along, with other data of S0. In one embodiment, the existing search result together with the existing reflective search results 410 are stored in storage 106 for future comparison and matching against new search contexts to determine whether the new search context and the existing search context are related. As described, if the new search context and the existing search context are related, both the new search context and the existing search contexts are merged to provide merged search results based on the match.

FIG. 4C illustrates an exemplary view of data structures of an algorithm before merging 420 and after merging 430 of new search context and the existing search contexts based on a match, in accordance with embodiments of the present invention.

In the depicted embodiment, reflective search result 1 of before merge 420 represents search results of an existing or previous search context stored in database 106. Reflective search result 2 represents a new search context. In one aspect, the new search context of reflective search result 1 of before merge 420 and the existing search context of reflective search result 2 of before merge 420 are closely related. For instance, result R22 and results R12 are closely related based on the result tree, thus as depicted, after merge 430 is designated as result R22, or a new search result tree, in accordance with embodiments of the present invention. After merge 430 represents an assumption that result R12 of reflective search result 2 is related to reflective search result 1, thus both reflective search result 1 and reflective search result 2 are merged as one designated result R22, in accordance with embodiments of the present invention.

Figure 5:
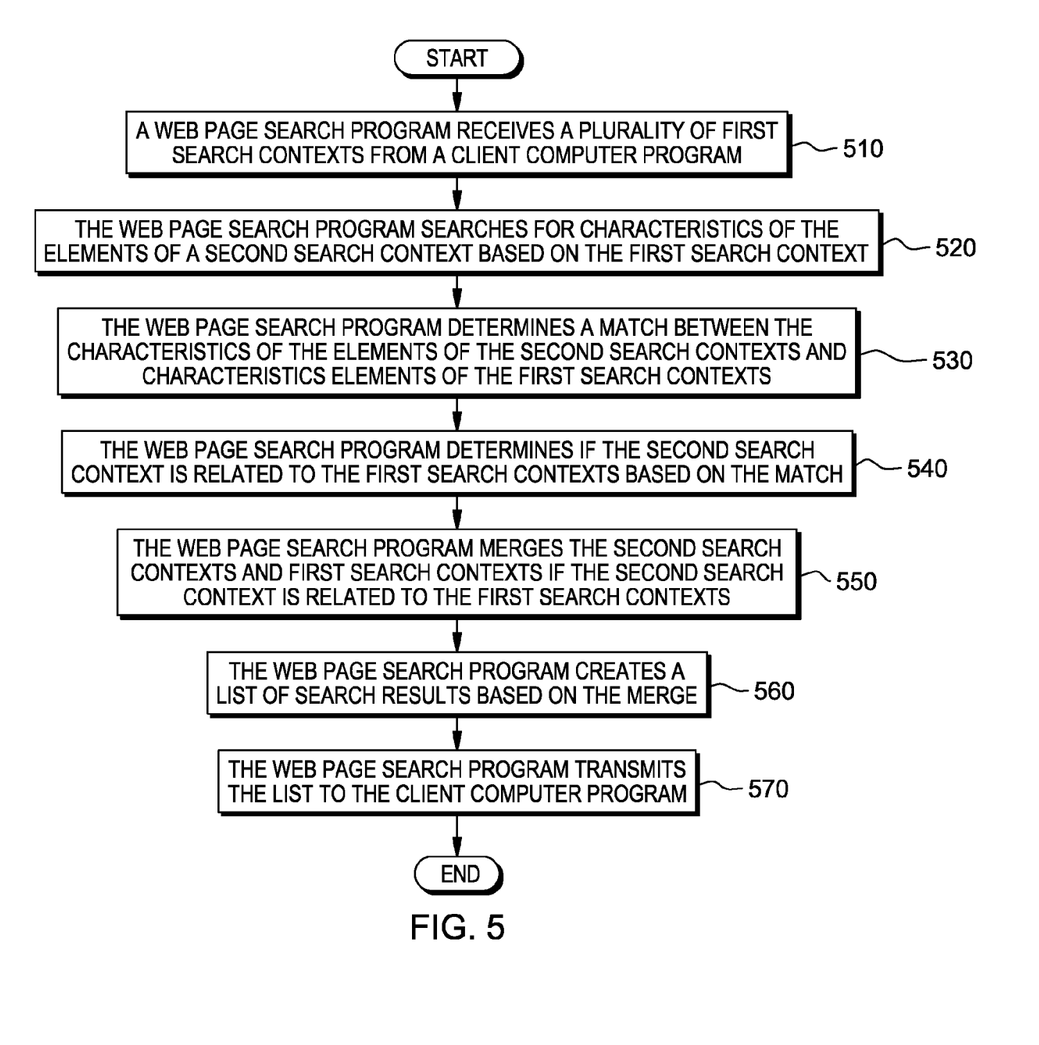
FIG. 5 is a flowchart depicting steps performed by a web page search program in accordance with embodiments of the present invention.

FIG. 5 is a flowchart depicting steps performed by web page search program 104 of FIG. 1, in accordance with embodiments of the present invention.

In step 510, web page search program 104 receives a plurality of first search contexts from a client computer program 111 of client devices 110, 112 and 114. In one embodiment, the plurality of the first search contexts includes parameters identifying characteristics of elements of second search contexts and parameters identifying weight of importance to the user that elements of the second search contexts includes the characteristics of the first search context.

In step 520, web page search program 104 searches for the characteristics of the elements of the second search contexts in storage device 106. In step 530, web page search program 104 determines a match between the characteristics of the elements of the second search contexts and characteristics elements of the first search contexts. In step 540, web page search program 104 determines if the second search context is related to the first search contexts based on the match, and wherein the web page search program 104 ranks a first list of search results based on the determination. In step 550, web page search program 104 merges the second search contexts and first search contexts if the second search context is related to the first search contexts. In step 560, web page search program 104 creates a second list of search results based on the merge. In step 570, web page search program 104 transmits the list to client computer program 111 for display in a user interface of client devices 110, 112, and 114.

Figure 6:
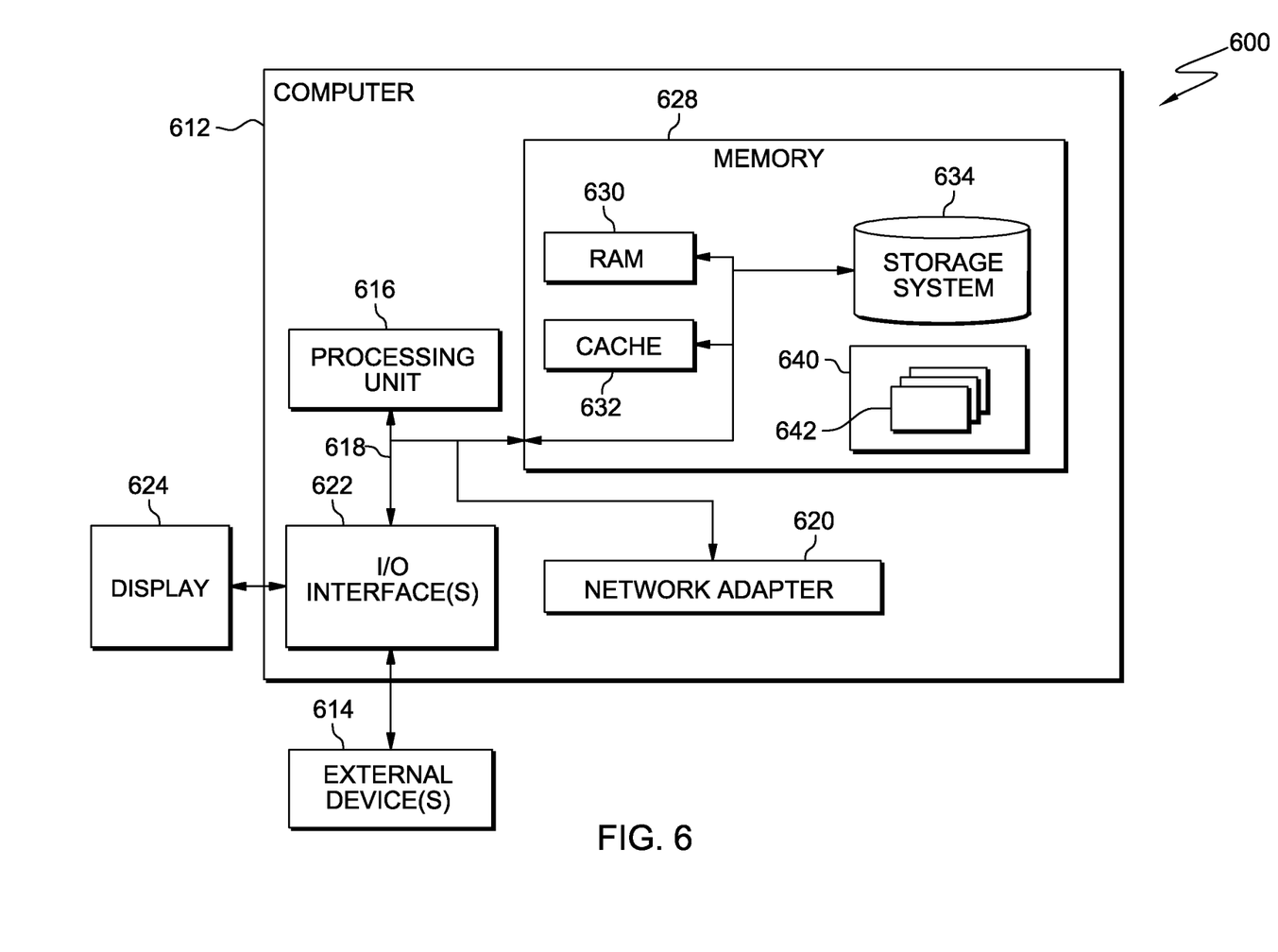
FIG. 6 illustrates a block diagram of components of computer system in accordance with embodiments of the present invention.

FIG. 6 is a functional block diagram of a computer system, in accordance with an embodiment of the present invention.

Computer system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In computer system 600 there is computer 612, which is operational with numerous other general purpose or special purpose computing system environments or configurations. Examples of well-known computing systems, environments, and/or configurations that may be suitable for use with computer 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of client devices 110, 112, and 114, and search engine server device 105 can include or can be implemented as an instance of computer 612.

Computer 612 may be described in the general context of computer system executable instructions, such as program modules, being executed by a computer system. Generally, program modules may include routines, programs, objects, components, logic, data structures, and so on that perform particular tasks or implement particular abstract data types. Computer 612 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 6, computer 612 is shown in the form of a general-purpose computing device. The components of computer 612 may include, but are not limited to, one or more processors or processing units 616, memory 628, and bus 618 that couples various system components including memory 628 to processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 612 typically includes a variety of computer system readable media. Such media may be any available media that is accessible by computer 612, and includes both volatile and non-volatile media, and removable and non-removable media.

Memory 628 includes computer system readable media in the form of volatile memory, such as random access memory (RAM) 630 and/or cache 632. Computer 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Client computer program 111 and web page search program 104 can be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Each one of Client computer program 111 and web page search program 104 are implemented as or are an instance of program 640.

Computer 612 may also communicate with one or more external devices 614 such as a keyboard, a pointing device, etc., as well as display 624; one or more devices that enable a user to interact with computer 612; and/or any devices (e.g., network card, modem, etc.) that enable computer 612 to communicate with one or more other computing devices. Such communication occurs via Input/Output (I/O) interfaces 622. Still yet, computer 612 communicates with one or more networks such as a local area network (LAN), a general wide area network (WAN), and/or a public network (e.g., the Internet) via network adapter 620. As depicted, network adapter 620 communicates with the other components of computer 612 via bus 618. It should be understood that although not shown, other hardware and/or software components could be used in conjunction with computer 612. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product generating reflective search results based on new search contexts and existing search contexts has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for searching within previous search results for new search results, the method comprising the steps of:
a first computer receiving first search contexts from a second computer, the first search contexts including parameters including characteristics of elements of second search contexts and parameters including weight of importance to a user that the elements of the second search contexts includes the characteristics of the first search contexts, wherein the weight of importance represents characteristics of elements of the second search contexts that are visited by the user during a previous web page search, and
wherein the characteristics of elements of second search contexts include an aggregate of search terms, search results, and data of the first search contexts and of the second search contexts, wherein the data includes user activities during a web page search of the first search contexts and the second search contexts including an accumulation of whether the user bookmarked the second search contexts and the first search contexts, how much time the user spent on the second search contexts and the first search contexts or how often the user visited the second search contexts or the first search contexts;
the first computer searching for the characteristics of the elements of the second search contexts in a repository;
the first computer determining a match between the characteristics of the elements of the second search contexts and the characteristics elements of the first search contexts, wherein the determination of the characteristics of elements is based on a match of uniform resource locators of the characteristics of the elements of the second search contexts and the characteristics elements of the first search contexts, wherein the determining further comprises: the first computer determining if accumulation of numerical values of both of the characteristics of the elements of the second search contexts and the characteristics elements of the first search contexts exceeds a defined threshold value, wherein the second search contexts and the first search contexts are considered a match if the accumulated numerical values exceeds the defined threshold value;

the first computer determining if the second search contexts are related to the first search contexts based on the match, wherein the numerical values are assigned to the characteristics of the elements of the second search contexts and the characteristics elements of the first search contexts, and wherein the first computer ranks a first list of search results based on the determinations:

the first computing merging the second search contexts and the first search contexts if the second search contexts are related to the first search contexts;

the first computer creating a second list of search results based on the merge; and the first computer transmitting the second list to the second computer.

2. The method of claim 1, wherein the characteristics of elements of second search contexts and the first search contexts are stored in the repository.

3. The method of claim 1, wherein the step of merging the second search contexts and first search contexts if the second search contexts are related to the first search contexts, further comprises: the first computer merging the second search contexts and first search contexts and the first list of search results.

4. The method of claim 1, further comprising:
the second computer displaying user interface elements that allows the user to search for the previous search results based on the first search contexts;
the second computer transmitting the search of the first search contexts to the first computer; and
the second computer displaying results of the search based on the first search contexts.

\* \* \* \* \*